(12) United States Patent
Russell et al.

(10) Patent No.: US 10,332,205 B1
(45) Date of Patent: Jun. 25, 2019

(54) BITCOIN KIOSK/ATM DEVICE AND SYSTEM AND METHOD OF USING THE SAME

(71) Applicants: Mark Russell, Reno, NV (US); John W. Russell, Reno, NV (US)

(72) Inventors: Mark Russell, Reno, NV (US); John W. Russell, Reno, NV (US)

( * ) Notice: Subject to any disclaimer, the term of this patent is extended or adjusted under 35 U.S.C. 154(b) by 812 days.

(21) Appl. No.: 13/942,930

(22) Filed: Jul. 16, 2013

(51) Int. Cl.
*G06Q 40/04* (2012.01)

(52) U.S. Cl.
CPC .................. *G06Q 40/04* (2013.01)

(58) Field of Classification Search
USPC ............ 705/39, 14, 44, 45, 38, 37, 26, 41; 235/379, 439, 375; 726/8, 71
See application file for complete search history.

(56) References Cited

U.S. PATENT DOCUMENTS

| | | | | |
|---|---|---|---|---|
| 7,152,783 B2* | 12/2006 | Charrin | ............... | G06Q 20/367 235/379 |
| 2003/0015583 A1* | 1/2003 | Abdi | ................... | G06Q 20/042 235/379 |
| 2007/0080215 A1* | 4/2007 | Ramachandran | .. | G06Q 20/1085 235/381 |
| 2008/0203150 A1* | 8/2008 | Royce-Winston | ............... | G06Q 20/0425 235/379 |
| 2012/0160912 A1* | 6/2012 | Laracey | ............... | G06Q 20/1085 235/379 |
| 2012/0262245 A1* | 10/2012 | Li | ............... | H03J 7/04 331/177 R |
| 2013/0103526 A1* | 4/2013 | Liu | ............... | G06Q 30/06 705/26.1 |
| 2013/0166455 A1* | 6/2013 | Feigelson | ............... | H04L 9/3234 705/64 |
| 2013/0173416 A1* | 7/2013 | Glasgow | ................ | G06Q 30/06 705/26.7 |
| 2013/0262295 A1* | 10/2013 | Narayanan | ............... | G06Q 20/30 705/39 |
| 2013/0332349 A1* | 12/2013 | Dent | ................ | G06Q 20/14 705/40 |
| 2015/0120569 A1* | 4/2015 | Belshe | ............... | G06Q 20/3829 705/71 |

* cited by examiner

*Primary Examiner* — Tien C Nguyen
(74) *Attorney, Agent, or Firm* — FisherBroyles, LLP; Rob L. Phillips (57) ABSTRACT

A standalone Bitcoin kiosk/ATM device including at least the following components: (i) a bill validator; (ii) bill dispenser; (iii) printer; (iv) code scanner; (v) touch screen display; (vi) computing power in the form of a processor/controller; and (vii) internet connection means. The standalone device may include other components such as a backup power supply. In practice, the standalone device facilitates the purchase and sale of Bitcoin. A plurality of devices and central computer/server may form a network of devices.

13 Claims, 14 Drawing Sheets

Buy Bitcoin
Deposit Money

$40
Deposited

Cancel

Next — 606

Buy Bitcoin

Success! Your Bitcoin is on its way!

₿1.13009634 has been sent to:
19xoJbvyfJQKHYBpu5JD9a4mczFC7QCAoS

Verify here:

http://goo.gl/poOHO

[Finish] — 622

Redeem Receipt

Scan The Transaction Number

641 e5e3a360-8366-11e2-b64b-b761fd1aad82

Cancel  Next

FIG. 4G  642

Redeem Receipt
Withdraw $40
Available

Cancel  Withdraw

BITCOIN KIOSK/ATM DEVICE AND SYSTEM AND METHOD OF USING THE SAME

FIELD OF THE INVENTION

The embodiments of the present invention relate to a Bitcoin kiosk/ATM device, system and method which facilitate the buying and selling of Bitcoin without the need for any third-party financial institution (e.g., banks).

BACKGROUND

Bitcoin is a decentralized digital currency based on an open-source peer-to-peer internet protocol. Bitcoin is by most accounts the most widely accepted alternative currency having a monetary base in excess of $1 billion (USD) and is accepted by merchants, including service providers, throughout the world. Bitcoin is managed unlike most typical currencies and such that the need for a central bank is eliminated. Instead, as referenced above, Bitcoin is managed via an internet-based peer-to-peer network.

It would be advantageous, to develop a standalone device capable of facilitating the purchase and sale of Bitcoin. Such a device should not require the use of any central monetary authority.

SUMMARY

Accordingly, one embodiment of the present invention comprises a standalone Bitcoin kiosk/ATM device including at least the following components: (i) a bill validator; (ii) bill dispenser; (iii) printer; (iv) code scanner; (v) touch screen display; (vi) computing power in the form of a processor/controller; and (vii) internet connection means. The standalone device may include other components such as a backup power supply. The computing power may be local or remote as part of a Bitcoin kiosk/ATM network. A plurality of devices and central computer/server may form a network of devices.

In practice, the standalone device facilitates the purchase of Bitcoin by: (i) permitting a user to deposit traditional currency (e.g., United States dollars); (ii) reading a code related to a digital account for receiving the purchased Bitcoin; (ii) confirming that the standalone device has sufficient Bitcoin to fund the purchase; (iv) generating and printing a receipt of the transaction. If the standalone device does not have sufficient funds to complete the transaction, the standalone device may acquire the necessary Bitcoin from the spot market by connecting to a Bitcoin exchange such as Mt. Gox (www.mtgox.com).

In practice, the standalone device facilitates the sale of Bitcoin via two stages. A first stage comprises: (i) accepting an amount of desired traditional currency (e.g., United States dollars) as entered by the user; (ii) creating a transaction in a database; (iii) prompting the user to transmit the user's Bitcoin to a digital address assigned to the standalone device; and (iv) generating and printing a redemption receipt. A second stage comprises a user redeeming the redemption receipt during which: (i) the redemption receipt is electronically read; (ii) a comparison of the redemption receipt to the transaction in the database is conducted; (iii) a network confirmation of the user's Bitcoin is conducted; (iv) a confirmation that the redemption receipt has not been redeemed is conducted; and (v) cash is dispensed from the standalone device.

Some of the steps required to buy and sell the Bitcoin may also be accomplished via a remote device such as a computer or smart phone which interacts with the standalone device.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a Bitcoin kiosk/ATM according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

Figure 1:
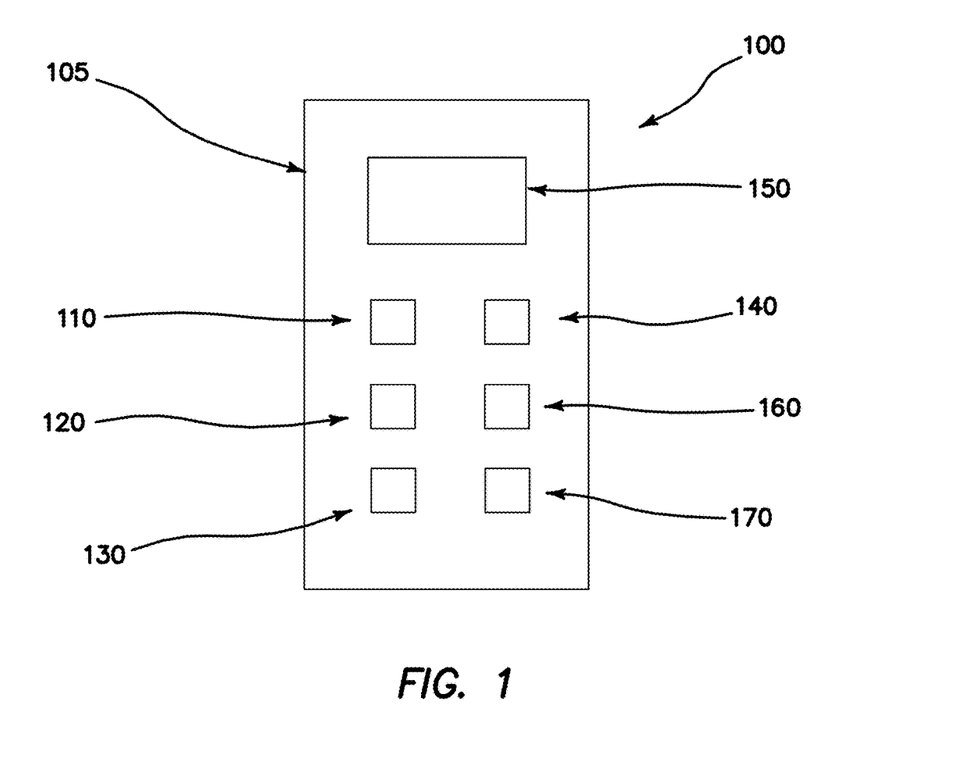
FIG. 1 illustrates a block diagram of a Bitcoin kiosk/ATM device according to the embodiments of the present invention.
Figure 5:
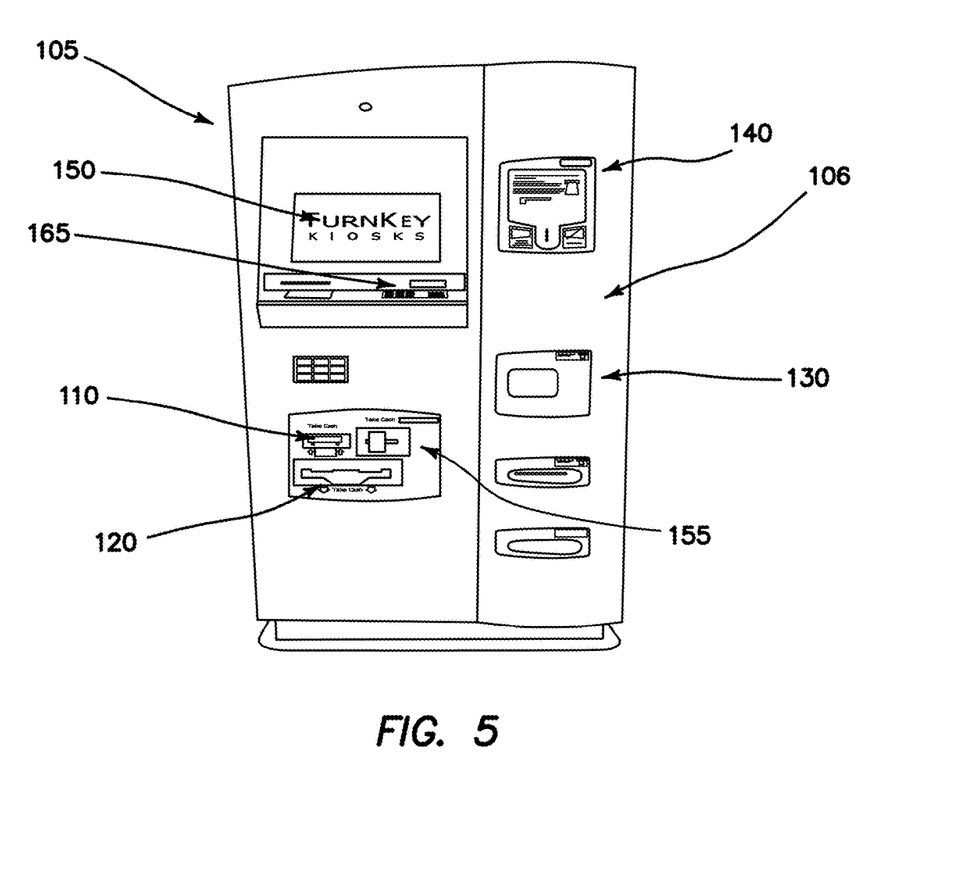
FIG. 5 illustrates an exemplary kiosk/ATM device design of the type which may be used to facilitate the embodiments of the present invention.

FIG. 1 shows a block diagram of a Bitcoin kiosk/ATM device 100 according to the embodiments of the present invention. Broadly, the Bitcoin/ATM device 100 comprises a bill validator 110, bill dispenser 120, printer 130, code reader/scanner 140, touch screen display 150, processor/controller 160 and wireless internet connection means (e.g. modem) 170 communicatively joined together using conventional means. A housing 105 contains and protects the aforementioned components and any others incorporated into the Bitcoin kiosk/ATM device 100. The housing 105 may define a standalone device, wall-mounted device, wall-embedded device and the like. As set forth above, software and firmware assist with the operation of the Bitcoin kiosk/ATM 100 as detailed below. While a touch screen display 150 is described herein, other user interfaces, such as a button panel, track ball and joystick, may be used as well. FIG. 5 shows an exemplary housing elevation 106 containing a bill validator 110, bill dispenser 120, printer 130, code reader/scanner 140 and touch screen display 150 which may facilitate the embodiments of the present invention.

Figure 2:
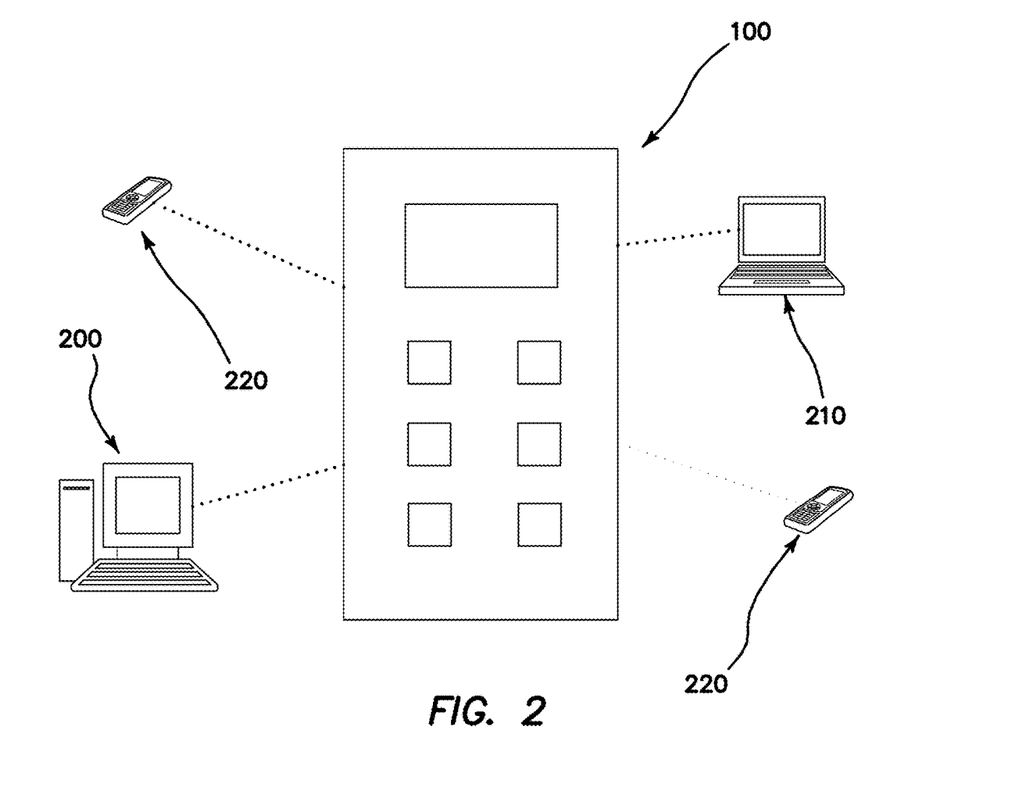
FIG. 2 illustrates a block diagram of a Bitcoin kiosk/ATM device with access via remote devices according to the embodiments of the present invention.

FIG. 2 shows the Bitcoin kiosk/ATM device 100 in communication with various remote devices including a desktop computer 200, laptop computer 210, smart phone 220 and smart tablet 230. In such an embodiment, the Bitcoin kiosk/ATM device 100 incorporates a RF transceiver 180 for communicating with said remote devices. The wireless communication link between the remote devices and Bitcoin kiosk/ATM 100 allows users to transact some aspects of Bitcoin purchases and sales remotely as described in more detail below.

Figure 3:
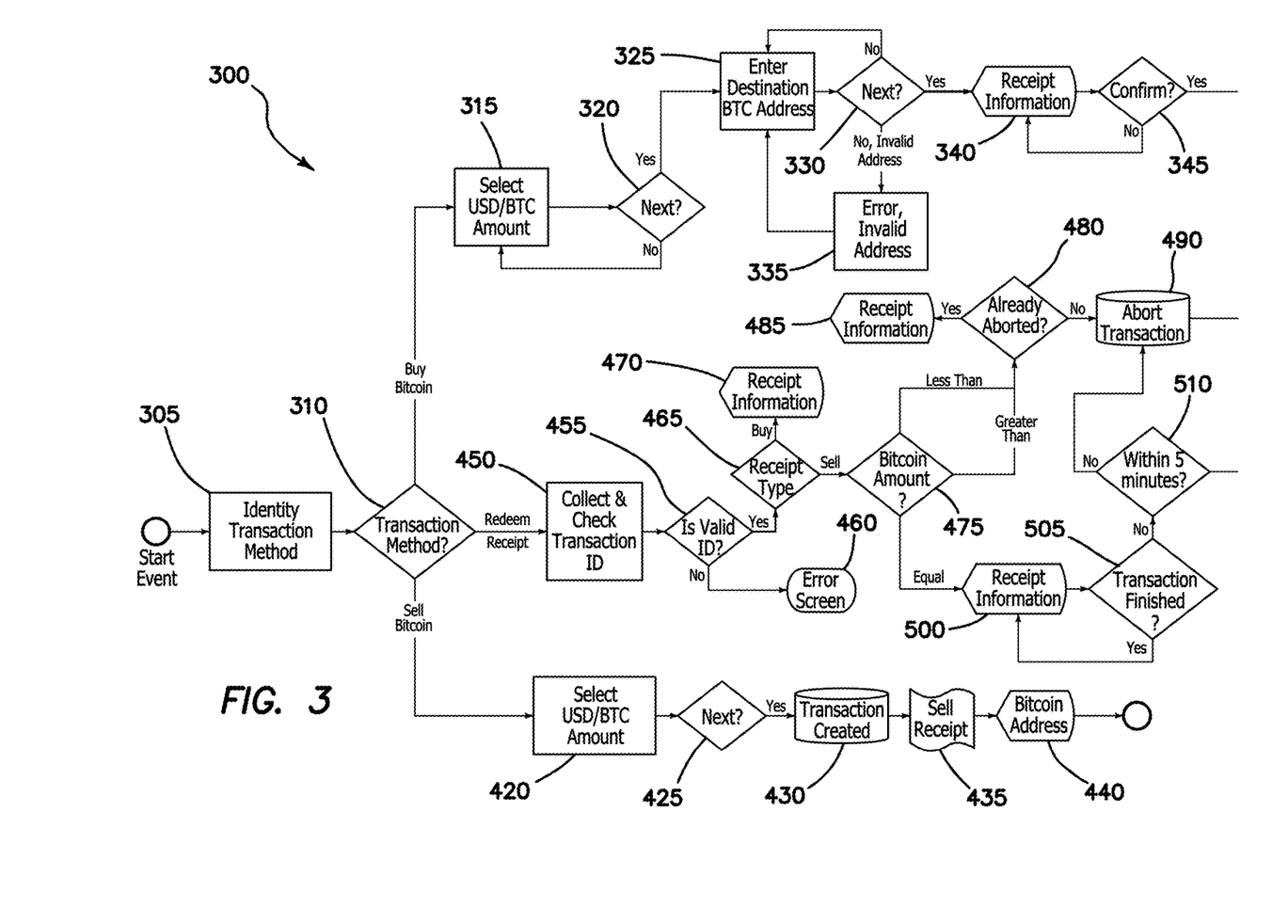
FIG. 3 illustrates a flow chart detailing an exemplary methodology followed by the Bitcoin kiosk/ATM according to the embodiments of the present invention.
Figure 4A:
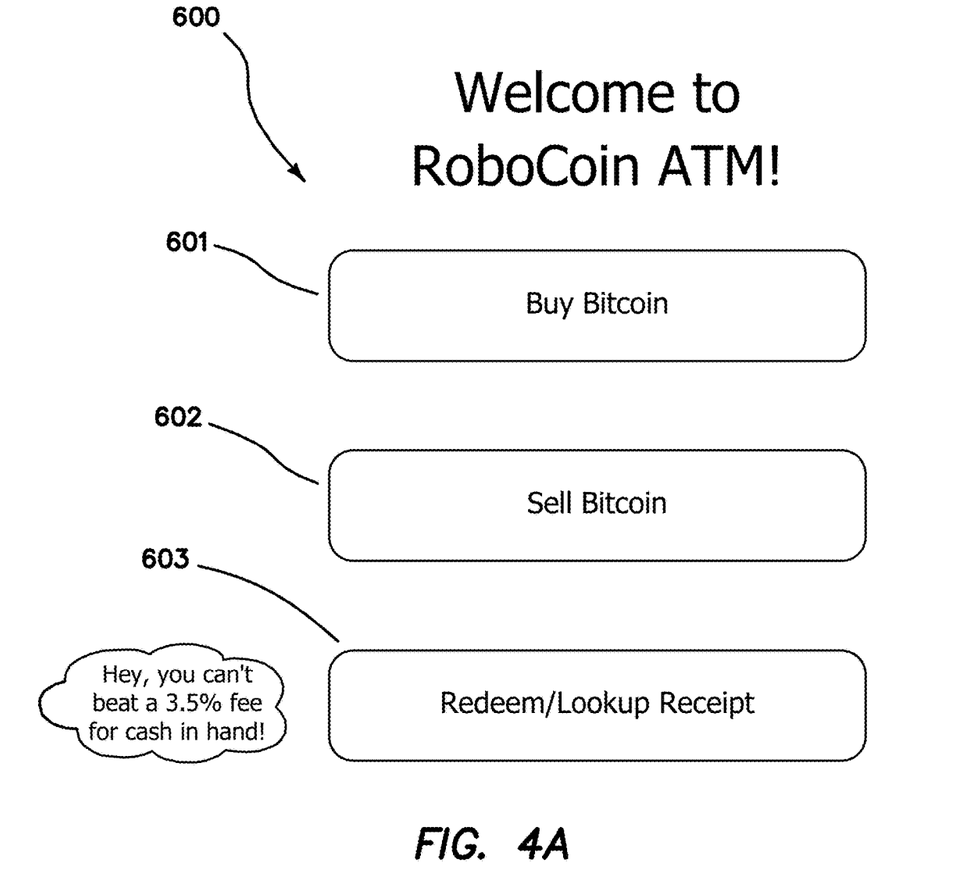
FIGS. 4a-4h illustrates a series of exemplary screen shots of a user interface associated with the Bitcoin kiosk/ATM according to the embodiments of the present invention.
Figure 4B:
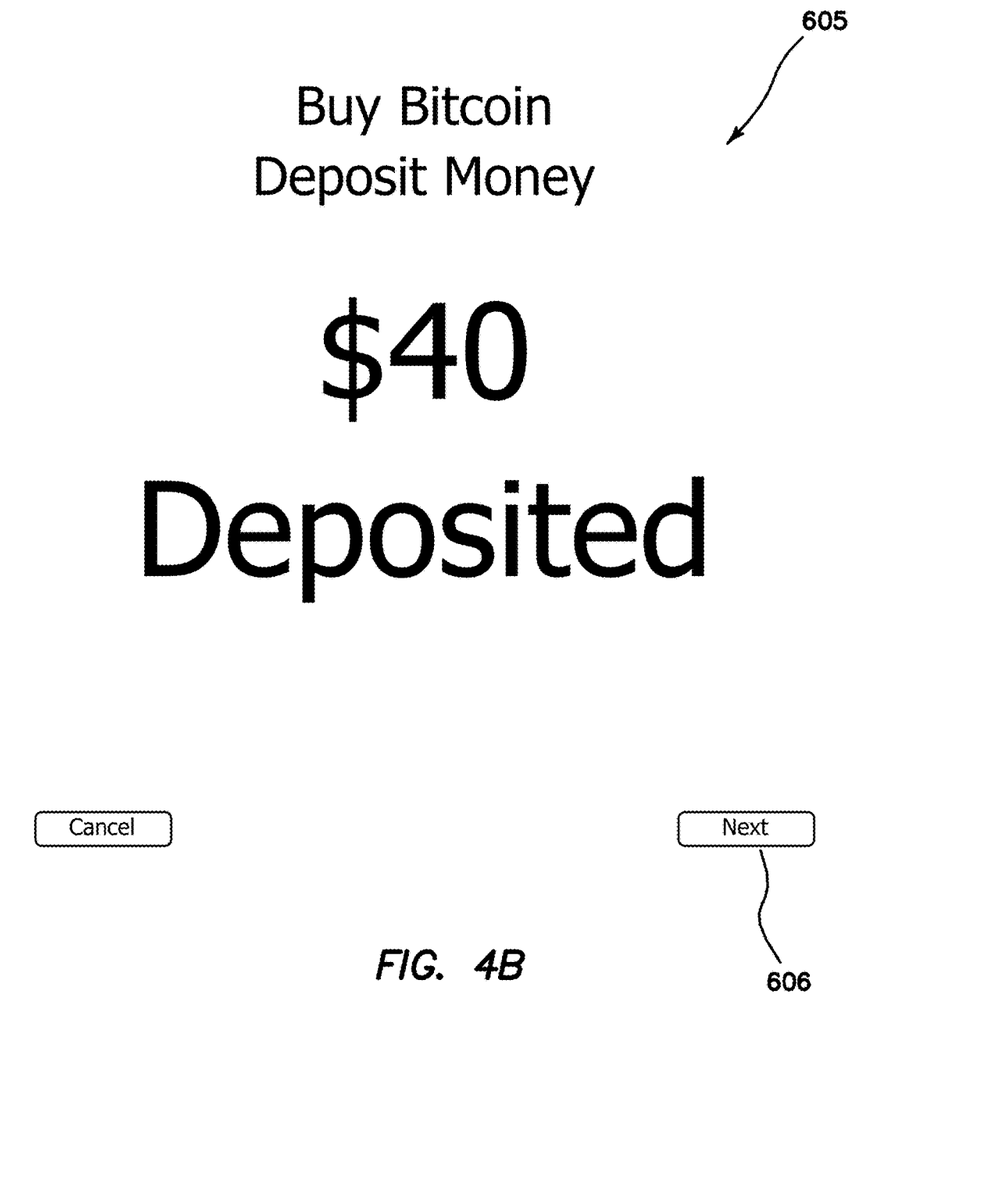
Figure 4C:
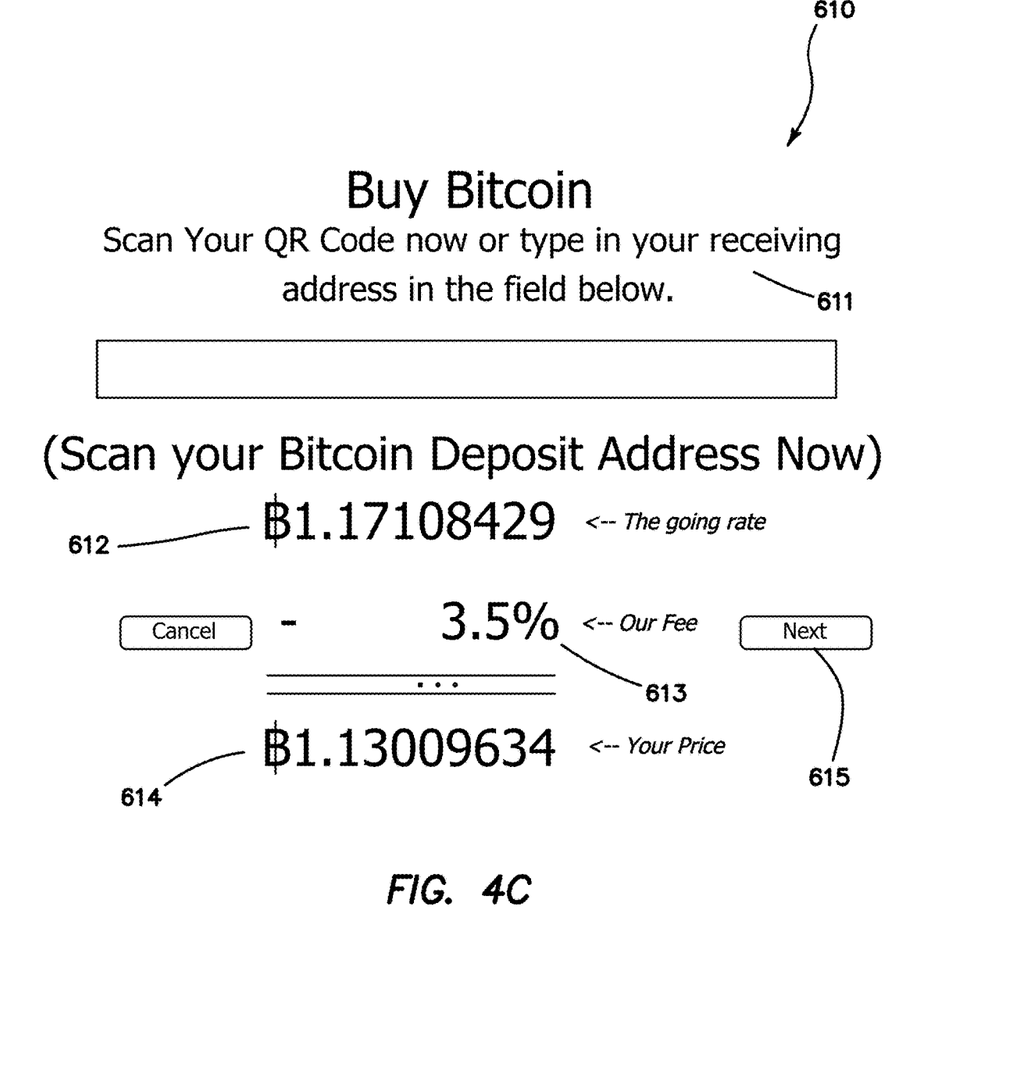
Figure 4D:
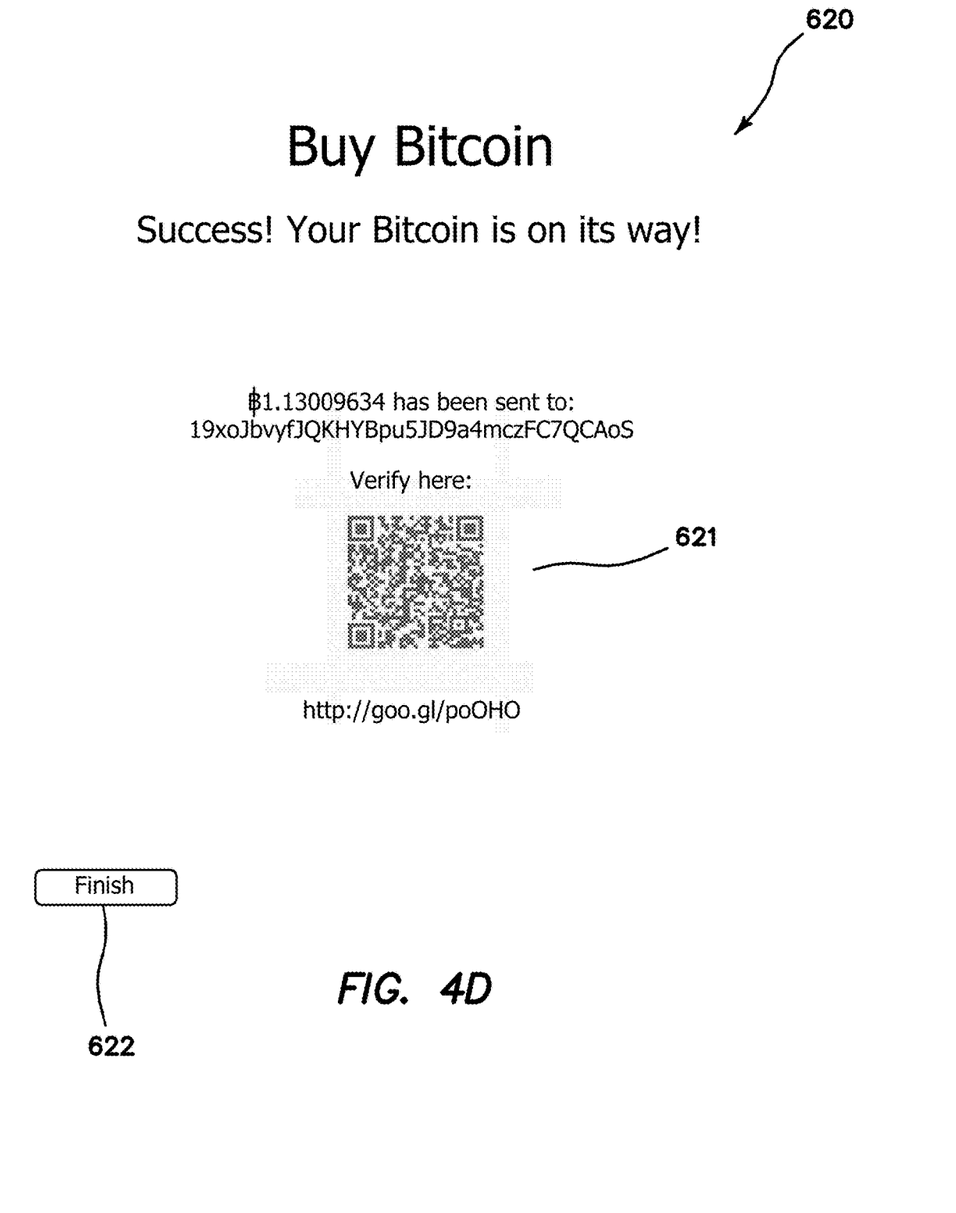
Figure 4E:
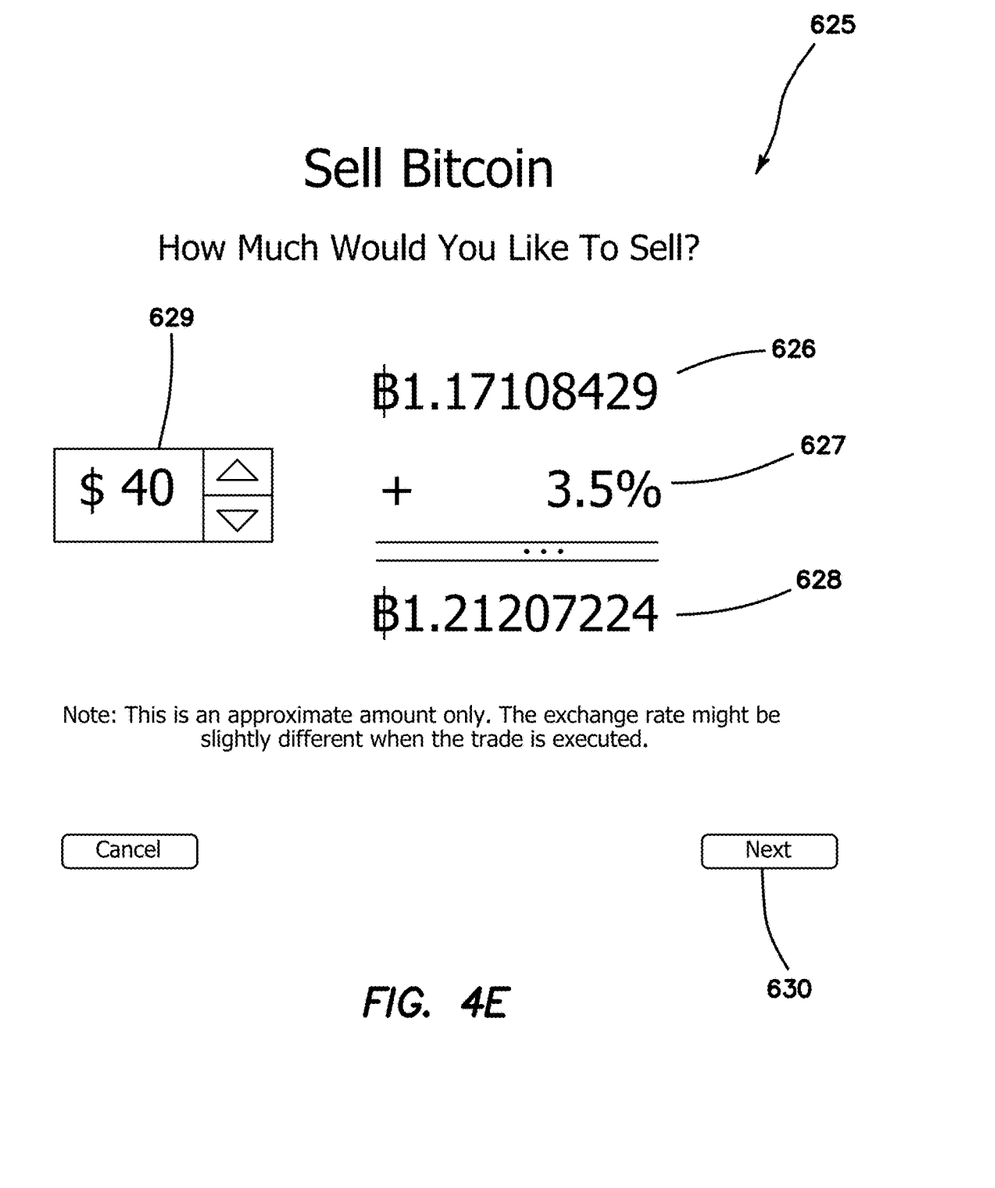
Figure 4F:
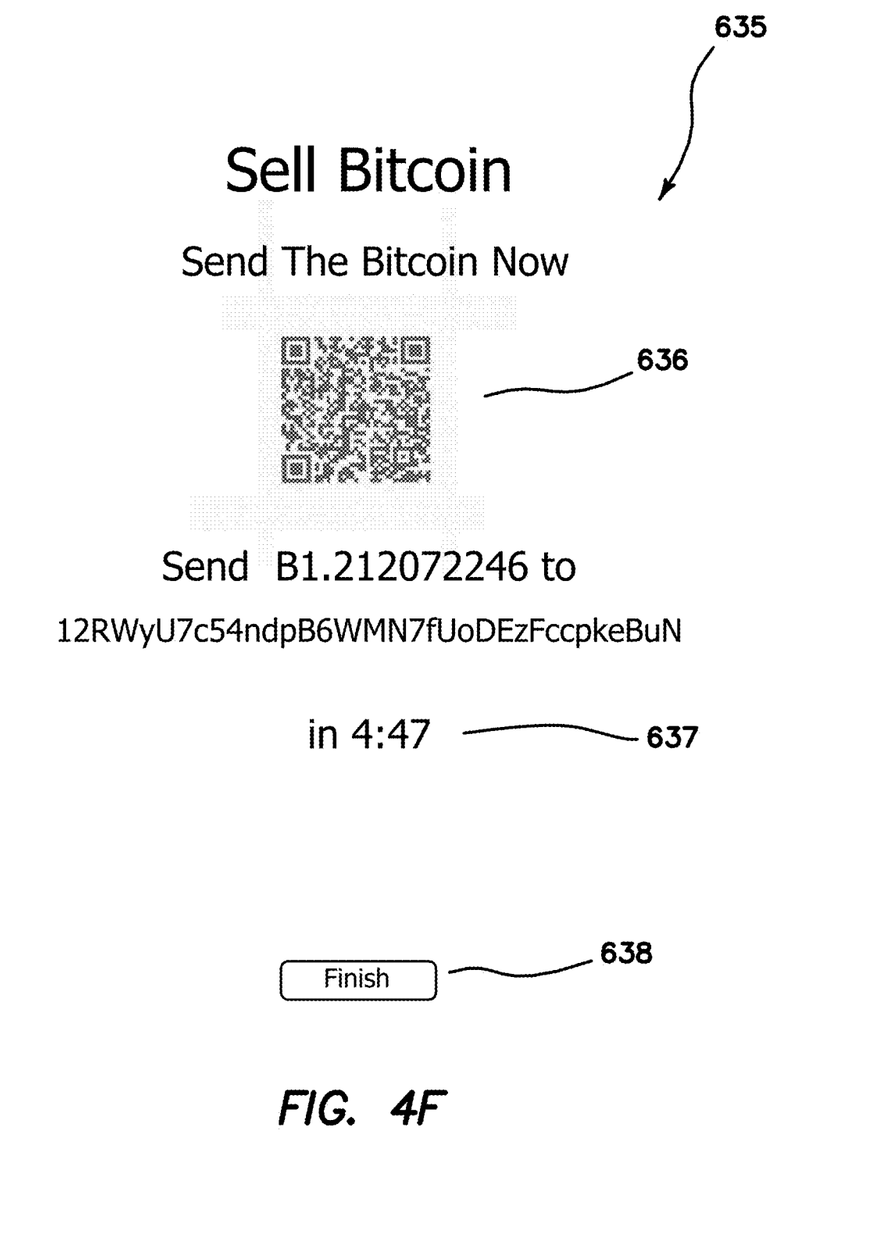
Figure 4G:
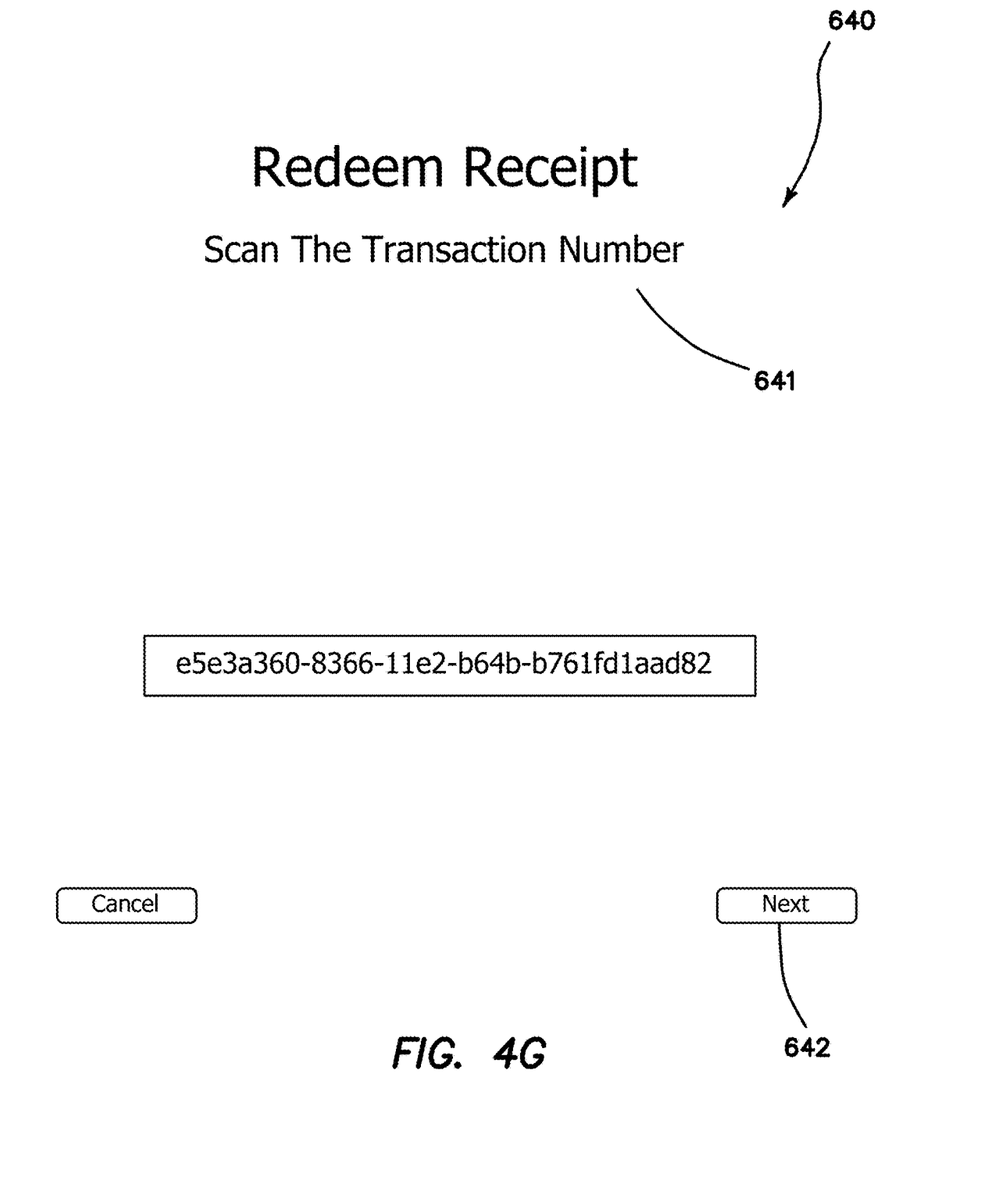
Figure 4H:
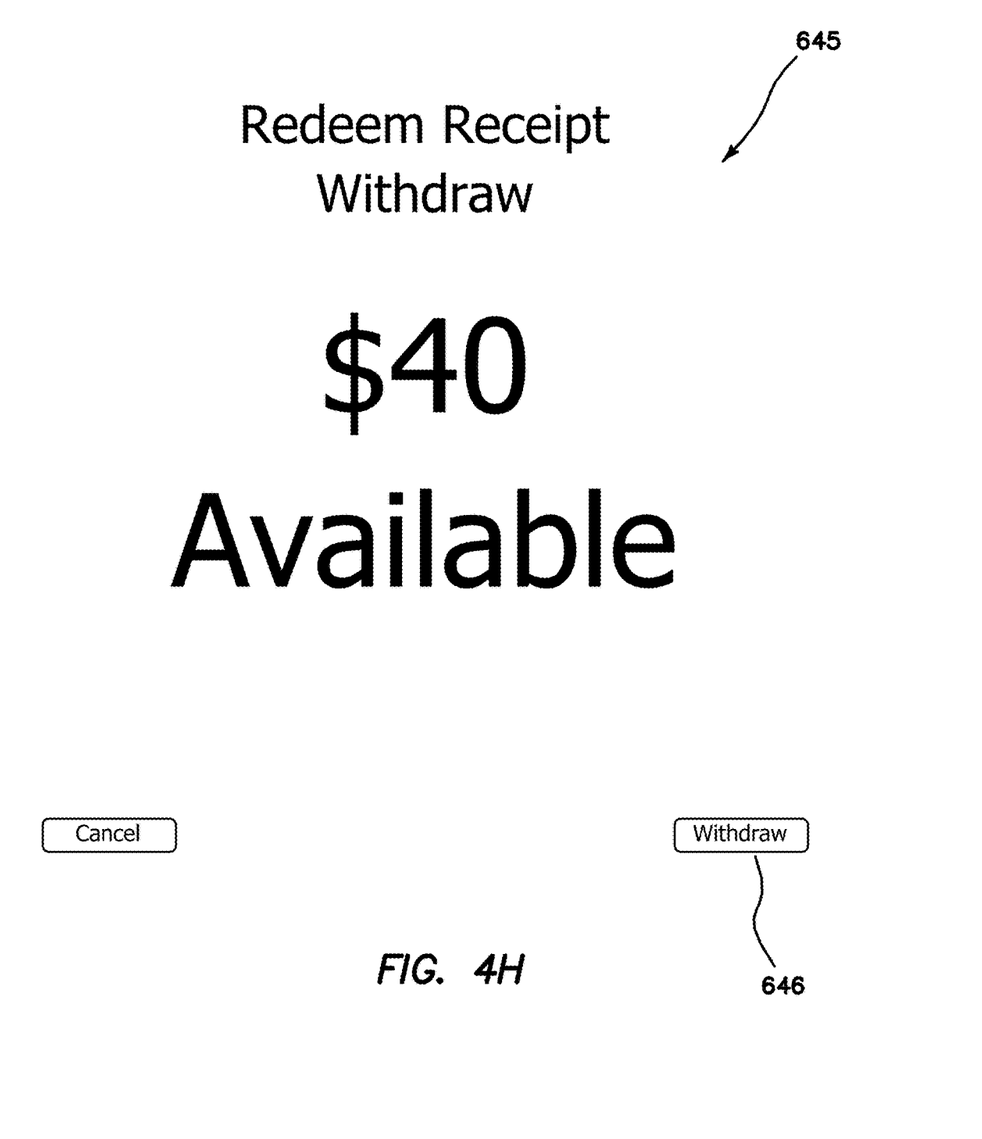

The Bitcoin kiosk/ATM device 100 facilitates Bitcoin transactions including purchases and sales of Bitcoin. FIG. 3 shows a flow chart 300 detailing one operational methodology followed by the Bitcoin kiosk/ATM device 100. The first process 305 is associated with determining the transaction type. At 310, it is determined whether the transaction type is a purchase of Bitcoin, sale of Bitcoin or receipt redemption based on the user's interaction with the Bitcoin kiosk/ATM device 100.

If, at 310, it is determined that the desired transaction type is the purchase of Bitcoin, at 315, the user selects an amount of Bitcoin to purchase or amount of conventional currency to exchange for Bitcoin. At 320, it is determined if the user has made the selection. If, at 320, no selection is made in a pre-established time frame, the chart 300 loops back to 320. Once a selection is made at 320, at 325, a destination Bitcoin address is entered by the user. The destination Bitcoin address is a digital address which is configured to receive the Bitcoin when electronically dispensed by the Botcoin kiosk/ATM device 100. In one embodiment, the user enters the destination Bitcoin address by manually entering the same via the touch screen display 150. In another embodiment, the code reader/scanner 140 reads a QR code, barcode or the like representing the destination Bitcoin address and which is depicted on the user's smart phone or similar electronic device. At 330, it is determined whether a destination Bitcoin address has been entered, not entered or entered improperly. If no Bitcoin address has been entered, the chart 300 loops back to 330. If an invalid code is entered at 330, at 335, a corresponding error message is created and the chart 300 loops back to 330 where the error message is displayed on the touch screen display 150. If a valid code is received at 330, at 340, receipt information is generated and displayed for the user to review. At 345, it is determined if the user has confirmed the receipt details via the touch screen display 150.

Upon confirmation of the receipt by the user, at 350, a transaction is created and stored in a corresponding database. At 355, a buy receipt is created. At 360, the user inserts cash/notes into the bill validator 110 of the Bitcoin kiosk/ATM 100. At 365, it is determined whether the cash deposit is too little, too much or accurate. If too much, at 370, the extra notes are rejected by the bill validator 110. If too little, the chart 300 loops back to 360 for the user to deposit additional notes. If the transaction is aborted by the user or Bitcoin kiosk/ATM 100, at 375, all notes are rejected and, at 380, the transaction is aborted.

If, at 365, the cash deposit is accurate, at 385, it is determined if the Bitcoin is available from the inventory managed by the Bitcoin kiosk/ATM device 100. If so, at 390, the Bitcoin transaction is completed such that, at 395, the Bitcoin is transmitted from the local digital address associated with the Bitcoin kiosk/ATM device 100 to the destination Bitcoin address provided previously by the user. Finally, at 400, a Bitcoin sent message is presented to the user via the touch screen display 150. Optionally, the Bitcoin sent message may also be transmitted to the user's smart phone or other mobile device. If, at 385, it is determined that the Bitcoin is not available in the inventory, at 405, the Bitcoin kiosk/ATM contacts, via wireless/wired internet connection means 170, an online Bitcoin exchange, such as Mt. Gox (www.mtgox.com), to determine if the Bitcoin is available. If so, at 410, the Bitcoin kiosk/ATM device 100 purchases the necessary Bitcoin from the exchange to complete the transaction. If, at 405, the Bitcoin kiosk/ATM device 100 determines that the Bitcoin exchange does not have the necessary Bitcoin available, at 415, a corresponding error message is presented to the user on the touch screen display 150.

If, at 310, it is determined that the transaction type is a sale of Bitcoin, at 420, the user selects an amount of Bitcoin or equivalent dollars to sell for cash. At 425, it is determined if the user has made the selection. If, at 425, no selection is made within a pre-established time period, the chart 300 loops back to 420. If, at 425, a selection is made, at 430, a transaction is created and stored in a corresponding database. At 435, a redemption receipt/coupon is generated and printed by printer 130. Printing the redemption receipt/coupon allows Bitcoin sale processing to occur. At 440, the user enters a Bitcoin address from which the Bitcoin to be sold is currently held.

At 450, the redemption receipt/coupon is redeemed via the code reader/scanner 140 such that the transaction ID created at 430 is collected and checked. At 455, it is determined if the transaction ID is valid. If not, at 460, a corresponding error message is presented to the user via the touch screen display 150. If, at 455, the transaction ID is validated, at 465, the receipt type is determined. At 470, a buy receipt determination at 465 results in receipt information being generated. If the receipt type is a buy, nothing happens because the buy has been, or should have already been, executed. The kiosk/ATM 100 will merely show a summary of the transaction. If, at 465, a sell receipt is identified a new workflow process is implemented because after a user sends Bitcoin to the kiosk/ATM 100, the Bitcoin network needs to process it. At 475, the amount of Bitcoin from the receipt and the subject transaction record are compared. If the Bitcoin amounts do not match, at 480, it is determined if the transaction has already been terminated. If so, at 485, a receipt is generated. If, at 480, it is determined that the transaction has not yet been aborted at 490, the transaction is aborted and, at 495, any withdrawn Bitcoin is refunded.

If, at 475, it is determined that the Bitcoin amounts do match, at 500, receipt information is evaluated and, at 505, it is determined if the transaction verification is complete. If not, the chart 300 loops back to 500. If, at 505, it is determined that the transaction verification is complete, at 510, it is determined if the transaction verification occurred within 5 minutes. If not, the flow chart 300 advances to 490. If a user does not send Bitcoin to the address provided by the kiosk/ATM 100 within the time period (e.g., 5 minutes), the order is deemed invalid. This is to mitigate market exchange rate fluctuations. If a user wishes to sell Bitcoin after the time period, a new transaction will need to be generated. If, at 510, it is determined that the transaction verification occurred within five minutes, at 515, the Bitcoin amount being offered for sale is verified by network confirmations. In one embodiment, one to six network confirmations (an industry standard) are deemed adequate to verify a suitable amount of Bitcoin held/owned by the seller. The well-established peer-to-peer Bitcoin network confirms transactions by recording the transactions in the transaction log or "blockchain" stored across the peer-to-peer network every 10-minutes. After six confirmed records or "blocks", which may take up to an hour, a transaction is usually considered confirmed beyond reasonable doubt. If a user scans his sell receipt before the Bitcoin network has finished processing it, nothing happens and the user has to wait until it is ready. If, at 515, it is determined that network confirmation has not occurred, at 520, the Bitcoin kiosk/ATM 100 device waits for confirmation and goes inactive. If, at 515, it is determined that network confirmation has occurred, at 525, the user is prompted to depress a withdraw button or icon on the touch screen display 150. At 530, it is determined if there is sufficient cash in the Bitcoin kiosk/ATM device 100 to fund the cash withdraw. If not, at 535, the withdrawal is rejected for lack of available funds. If, at 530, it is determined that there are sufficient funds available, at 540, the user is prompted to confirm the withdrawal. If confirmation occurs, at 545, the transaction is finished and, at 550, the cash/notes are dispensed.

FIGS. 4a-4h show a series of exemplary screen shots of the type which can be presented to the user via the touch screen display 150. Introductory screen shot 600 depicts a Buy Bitcoin icon 601, Sell Bitcoin icon 602 and Redeem/Lookup Receipt icon 603. Screen shot 605 depicts confirmation of $40 being deposited as part of a buy Bitcoin transaction. Using next icon 606 takes the user to screen shot 610 depicting an instruction 611 for the user to scan in the QR code or type in the destination Bitcoin address. The screen shot 610 also shows the going exchange rate 612 and the fee 613 charged by the operator of the Bitcoin kiosk/ATM device 100 and the price of the purchase 614. Using next icon 615 takes the user to screen shot 620 depicting a confirmation of the Bitcoin being transmitted to the destination Bitcoin address. The screen shot 620 also shows a transaction verification in the form of a QR code 621. Use of a finish icon 622 ends the buy transaction. Screen shot 625 depicts an initial page responsive to a sell Bitcoin transaction. The screen shot 625 also shows the going exchange rate 626 and the fee 627 charged by the operator of the Bitcoin kiosk/ATM device 100 and the price of the sale 628. An amount of Bitcoin to be sold in dollars may be entered using dynamic icon 629. Using next icon 630 takes the user to screen shot 635 prompting the user to send the Bitcoin to the Bitcoin address associated with the Bitcoin kiosk/ATM device 100 via QR code 636 and a timer 637 associated therewith. Use of a finish icon 638 ends the first portion of the sell Bitcoin transaction (i.e., prior to redeeming the redemption receipt/coupon which is part two of the sell Bitcoin transaction). Screen shot 640 is an initial screen shot associated with redeeming a redemption receipt/coupon prompting a scan of the transaction number 641 from the redemption receipt/coupon. Using next icon 642 takes the user to screen shot 645 depicting a statement that the cash is available to withdraw by using withdraw icon 646.

FIG. 5 shows an exemplary housing elevation 106 of a housing 105 containing a bill validator 110, bill dispenser 120, printer 130, code reader/scanner 140, touch screen display 150, debit/credit card reader 155 and optional button panel 165 which may facilitate the embodiments of the present invention.

Figure 6:
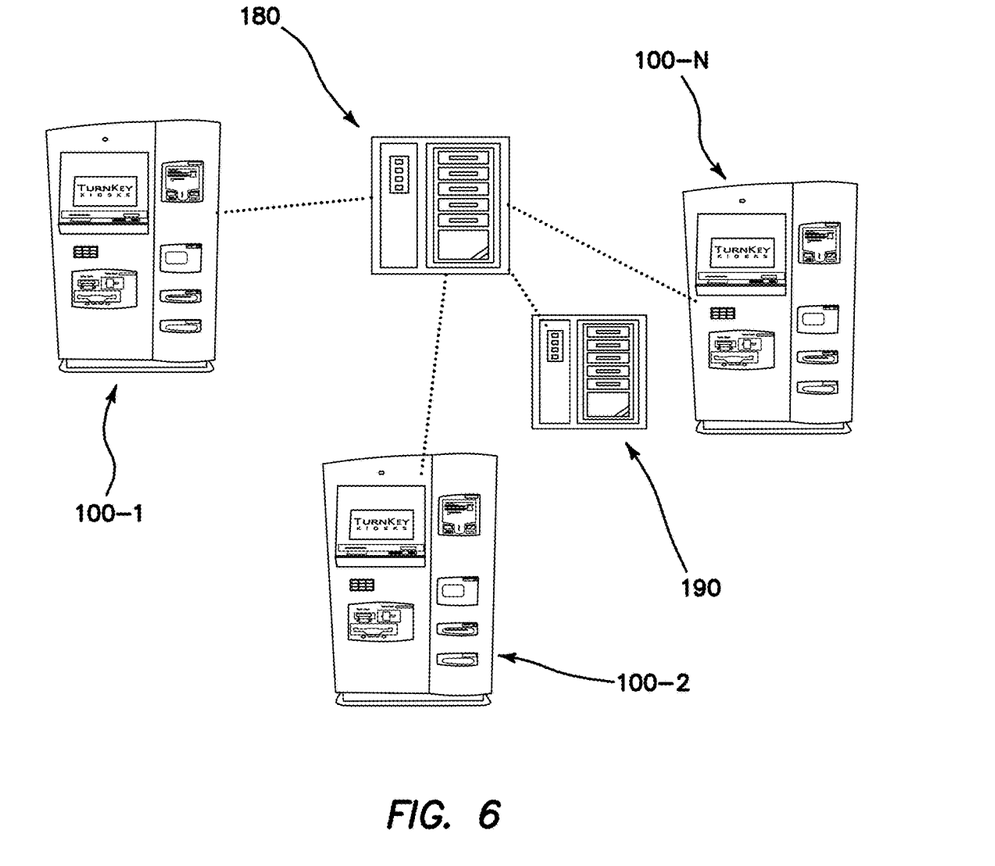
FIG. 6 illustrates a network of kiosk/ATM devices according to the embodiments of the present invention.

FIG. 6 shows a network comprising a plurality of Bitcoin kiosk/ATM devices 100-1 through 100-N in wired and/or wireless communication with a central computer/server 180. The central computer/server 180 may control various functionalities of the Bitcoin kiosk/ATM devices 100-1 through 100-N. In one embodiment, the Bitcoin kiosk/ATM devices 100-1 through 100-N may be substantially dummy devices or may have modest to significant processing power. The central computer/server 180 may also communicate with a website hosting server 190 to facilitate communication with a Bitcoin exchange as described above.

Although the invention has been described in detail with reference to several embodiments, additional variations and modifications exist within the scope and spirit of the invention as described and defined in the following claims.

We claim:

1. A device comprising:
a bill validator;
a bill dispenser;
a user interface; and
a processor programmed to run executable instructions, said executable instructions causing said processor, responsive to a request by a user via said user interface, to:
for purposes of receiving Bitcoin in exchange for cash: (i) upon availability in a local Bitcoin inventory associated with said device and accessible by said processor, transmit Bitcoin from said local Bitcoin inventory to a remote unique user-supplied digital address in exchange for cash inserted into, and said cash validated by, said bill validator, said remote unique user-supplied digital address supplied by said user via said user interface; and (ii) upon a lack of availability in said local Bitcoin inventory, automatically communicate, via a network connection, with a third party Bitcoin exchange remote from said device to determine availability of Bitcoin at said Bitcoin exchange at least equivalent to said cash inserted into said device, if available at said Bitcoin exchange, purchase Bitcoin, accept said purchased Bitcoin into said local Bitcoin inventory and electronically transmit said Bitcoin to said remote unique user-supplied digital address in exchange for said cash inserted into said bill validator; and for purposes of receiving cash in exchange for Bitcoin: verify Bitcoin transmitted by said user from said remote unique user-supplied digital address to said local Bitcoin inventory and, if verified, dispense cash via said bill dispenser in exchange for said Bitcoin transmitted by said user from said remote unique user-supplied digital address to said digital Bitcoin inventory.

2. The device of claim 1 further comprising a printer.

3. The device of claim 1 further comprising an internet connection means.

4. The device of claim 3 wherein said processor is further configured to utilize said internet connection means to contact a Bitcoin exchange to fund requests for Bitcoin in exchange for cash.

5. The device of claim 1 further comprising a web address associated with the device.

6. The device of claim 1 further comprising digital means for storing Bitcoin.

7. The device of claim 1 further comprising a code reader for reading a code representative of a digital address associated with Bitcoin inventory of a user.

8. A system comprising:
a central computer;
a plurality of devices in communication with said central computer forming a network, each of said devices comprising:
a bill validator;
a bill dispenser; and
a user interface; and
wherein one or more processors are programmed to run executable instructions, said executable instructions causing one of said devices, responsive to a request by a user via a user interface of said device, to:
for purposes of receiving Bitcoin in exchange for cash: (i) upon availability in a local Bitcoin inventory associated with said device and accessible by said processor, transmit Bitcoin from said local Bitcoin inventory to a remote unique user-supplied digital address in exchange for cash inserted into, and said cash validated by, said bill validator, said remote unique user-supplied digital address supplied by said user via said user interface; and (ii) upon a lack of availability in said local Bitcoin inventory, automatically communicate, via a network connection, with a third party Bitcoin exchange remote from said device to determine availability of Bitcoin at said Bitcoin exchange at least equivalent to said cash inserted into said device, if available at said Bitcoin exchange, purchase Bitcoin, accept said purchased Bitcoin into said local Bitcoin inventory and electronically transmit said Bitcoin to said remote unique user-supplied digital address in exchange for said cash inserted into said bill validator; and for purposes of receiving cash in exchange for Bitcoin: verify Bitcoin transmitted by said user from said remote unique user-supplied digital address to said local Bitcoin inventory and, if verified, dispense cash via said bill dispenser in exchange for Bitcoin transmitted by said user from said remote unique user-supplied digital address to said digital Bitcoin inventory.

9. The system of claim 8 wherein each device further comprises a printer.

10. The system of claim 8 wherein said central computer includes internet connection means.

11. The system of claim 10 wherein said central computer is configured to utilize said internet connection means to contact a Bitcoin exchange to fund requests for Bitcoin in exchange for cash.

12. The system of claim 8 further comprising digital means for storing Bitcoin.

13. The system of claim 8 wherein each device further comprises a code reader for reading a code representative of a digital address associated with Bitcoin inventory of a user.

* * * * *